(12) United States Patent
Zou

(10) Patent No.: US 7,583,697 B2
(45) Date of Patent: Sep. 1, 2009

(54) METHOD AND DEVICE FOR TRANSMITTING LOW SPEED SIGNALS IN OPTICAL TRANSPORT SYSTEM

(75) Inventor: Shimin Zou, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 378 days.

(21) Appl. No.: 11/677,727

(22) Filed: Feb. 22, 2007

(65) Prior Publication Data

US 2007/0189336 A1      Aug. 16, 2007

Related U.S. Application Data

(63) Continuation of application No. PCT/CN2005/001329, filed on Aug. 26, 2005.

(30) Foreign Application Priority Data

Aug. 26, 2004  (CN) .................... 2004 1 0057355

(51) Int. Cl.
  *H04J 3/16*   (2006.01)
  *H04J 3/22*   (2006.01)
(52) U.S. Cl. ................ 370/466; 370/535; 370/538
(58) Field of Classification Search .............. None
  See application file for complete search history.

(56) References Cited

U.S. PATENT DOCUMENTS 5,189,673 A * 2/1993 Burton et al. .............. 370/490
5,687,014 A * 11/1997 Czerwiec et al. ............. 398/75
6,539,031 B1 * 3/2003 Ngoc et al. ................. 370/470
6,744,789 B1 * 6/2004 Michener .................... 370/509
6,907,048 B1 * 6/2005 Treadaway et al. ......... 370/474
7,058,090 B1 * 6/2006 Player et al. ................ 370/536

* cited by examiner

*Primary Examiner*—Chi H Pham
*Assistant Examiner*—Soon-Dong D Hyun
(74) *Attorney, Agent, or Firm*—Finnegan, Henderson, Farabow, Garrett & Dunner, LLP

(57) ABSTRACT

A method and device for transmitting low speed signals in an Optical Transport Network (OTN), including: mapping each channel of low speed signal into an ODU signal; dividing each OPUk payload area into one or more time slots, byte interleaving each channel of OPU payload into the time slots; frame interleaving the OPU justification overhead corresponding to each channel of OPU payload in different frames of OPUk justification overhead; frame interleaving the ODU overhead corresponding to each channel of OPU payload in different frames of ODUk overhead; transforming an ODUk signal containing the OPUk payload, OPUk justification overhead and ODUk overhead into an OTUn signal and transmitting the ODUk signal in an OTN. Therefore the multiplexing and de-multiplexing method and device for implementing the transparent transmission of the low speed signal in the OTN may be implemented.

22 Claims, 8 Drawing Sheets

METHOD AND DEVICE FOR TRANSMITTING LOW SPEED SIGNALS IN OPTICAL TRANSPORT SYSTEM

CROSS-REFERENCES TO RELATED APPLICATIONS

This is a continuation of International Application No. PCT/CN2005/001329 filed Aug. 26, 2005, which claims the benefit of Chinese Patent Application No. 200410057355.0 filed Aug. 26, 2004, the entire respective disclosures of which are hereby incorporated herein by reference.

BACKGROUND OF THE INVENTION

1. Field of the Invention

The invention relates to signal multiplexing technologies in Optical Transport Network (OTN), and particularly to a method and device for transmitting low speed signals in an OTN.

2. Related Technology

In recent years, along with the continuous growth of voice services and data services, the demand of operators for the capacity of the transport network has risen continuously. The multiplexing technique of Plesiochronous Digital Hierarchy (PDH) is the earliest mode for increasing transfer capacity. The Synchronous Digital Hierarchy (SDH) technique appearing later has increased transfer capacity greatly. The SDH technique is, however, still a multiplexing technique in nature in a byte interleaved multiplexing mode, which is different from the bit interleaved multiplexing mode of PDH. For implementing a large capacity transfer, it is necessary to multiplex a low speed SDH signal into a high speed SDH signal, for example multiplex 4 channels of Constant Bit Rate 155 (CBR155) signals to 1 channel of CBR622 signal or multiplex 16 channels of CBR155 signals to 1 channel of CBR2G5 signal. The highest line rate of SDH is the rate of Synchronous Transmission Module-256 (STM-256) nowadays; the transmission at a higher rate is limited by the progress of devices and the cost factor. Herein, CBR155 indicates an STM-1/OC3 signal, and CBR622 indicates an STM-4/OC12 signal.

After the Dense Wavelength Division Multiplexing (DWDM) technique appears, line transfer capacity is increased revolutionarily; a simultaneous transfer with a plurality of wavelengths may be implemented on an optical fiber; a 1.6 Tbits/S equivalent line capacity is achieved by means of the widely used technique at the present, and a 10-100 Tbits/S line capacity is already achieved by means of some leading technical investigation.

A waste of wavelength is still caused if a wavelength is assigned for each rate for transmission when there are signals with different modulated rates to be transferred despite the ability of the DWDM technique to solve the problem of line transfer capacity. A common solution is to multiplex a plurality of low speed signals to a high speed signal then transfer the high speed signal by one wavelength so as to increase the utilization of wavelength.

Along with the good progress made by International Telecommunication Union-Telecommunication Standardization Sector (ITU-T) in G.709, G.798 and G.87X series recommendations, an OTN technique becomes well proved gradually. The technique OTN, integrated with the previous electric layer multiplexing technique and optical layer technique, has advantages such as an ability of remarkable Forward Error Correaction(FEC), multi-hierarchical Tandem Connection Monitoring (TCM), transparent transmission of almost all client signals, expandable cross-dispatching based on ODU1 granularity, and perfect performance management and fault management in the optical channel layer.

In order to increase single wavelength capacity and implement the multiplexing transfer of a plurality of low speed signals, a method of transparently mapping and transparently multiplexing is described in OTN recommendation G.709. Signals such as an Optical Channel Payload Unit (OPUk), Optical Channel Data Unit (ODUk) and Optical Channel Transport Unit (OTUk) are also defined. Shown in FIG. 1 is a frame structure of an OPU1. From FIG. 1, it can be seen that all the 4 rows of columns 15 to 3824 represent the size of the entire OPU1. Columns 15 and 16 are OPU1 Overhead (OH), and columns 16 and 17 of row 4 are Negative Justification Opportunity (NJO) and Positive Justification Opportunity (PJO) respectively. In addition, JC is a justification control byte, PSI is a payload structure identifier (PSI) byte, RES is a reserved byte, and the area marked by D is an OPU1 payload area. The area of 14 columns before OPU1, not shown in FIG. 1, is an ODU1 overhead area.

When CBR2G5 is adapted to an OPU1, frequency difference of client signal CBR2G5 is absorbed by the PJO and NJO in the OPU1 overhead; then ODU1 overhead is added to the OPU1 to form an ODU 1.

Then, the ODU1 is multiplexed to an QDU2 according to a multiplexing solution as shown in FIG. 2. An ODTU12 is formed by adding justification overhead ODTU12 JOH to an ODU1; four ODTU12s are multiplexed to an ODTUG2 in a time division multiplexing mode; then, the ODTUG2 is mapped into an OPU2; eventually, an ODU2 is formed by adding ODU2 overhead to the OPU2. The entire multiplexing process above is an asynchronous byte multiplexing process, and four CBR265 client signals may be transparently, asynchronously mapped and multiplexed into one OPU2 signal.

In a G.709 frame structure, by utilizing a Positive and Negative justification Opportunity and a Justification Control byte in an OPUk to absorb the frequency difference of a signal, a ±45 ppm (part per million) justification range of a client signal may be realized, while under common conditions, the justification range of the rate of CBR client signal will not exceed ±20 ppm. For example, 4 channels of CBR2.5G signals may be asynchronously and respectively mapped into the respective ODU1s, and 4 channels of ODU1s are then asynchronously multiplexed into an OPU2 signal, which are similar to asynchronous multiplexing of PDH, so timing transparence of the signals over 2.5G may be ensured by means of the mapping method in G.709. The positive and negative justification opportunity (PJO and NJO) in an OPUk may be replaced by other bytes for the same effect. However, the transparence for a client signal in accordance with the existing recommendation G.709 is in deed confined to the client signals over 2.5G; while there is no solution provided for the transparent multiplexing with the client signals under 2.5G. If low speed signals such as CBR155 and CBR622 are directly adapted to the low rate ODU to implement multiplexing with the solution described in the existing recommendation G.709 used indiscriminately, the rate of the final signal will inevitably be higher than that of the OPU1 after 16 channels of 155M CBR or 4 channels of 622M CBR signals are, through frequency justification, mapped into the same rate OPU, then added to the corresponding ODU overhead and made an asynchronous multiplexing. Therefore, the existing multiplexing mode in G.709 cannot be directly used for the multiplexing of the CBR155/622 signal.

In a word, for transparent transmission, all the information characteristics of a client signal should be entirely reserved, and particularly, the transparent transmission of the timing information of the signal should be included so that all the characteristics of a client signal will not change when the client signal is transferred from a node to another node. However, due to the particularity of a low speed signal, there is not yet a good solution so far by which the transparent transmission of the low speed signal in OTN as well as the end-to-end performance monitoring and management of the low speed signal are fully implemented. Since in the present OTN network, particularly in the metropolitan area network, the low speed signals such as CBR155 and CBR622 are still widely used, it is highly desirable to provide a completely new transparent multiplexing solution to multiplex CBR155 and CBR622 signals transparently and implement the end-to-end performance monitoring and management of the low speed signals in a metropolitan area network, particularly in the implementation of metropolitan area OADM.

SUMMARY OF THE INVENTION

Embodiments of the invention provide a method and device for transmitting low speed signals in an Optical Transport Network (OTN) to implement the transparent multiplexing of the low speed signals in the OTN and the end-to-end performance monitoring and management of the low speed signals.

A method for transmitting low speed signals in an Optical Transport Network (OTN) includes:

mapping each channel of low speed signal into an Optical Channel Data Unit (ODU) signal at the same grade as that of the low speed signal;

byte interleaving each channel of Optical Channel Payload Unit (OPU) payload of ODU signal in each time slot of Optical Channel Payload Unit k (OPUk) payload area of Optical Channel Data Unit k (ODUk) signal;

frame interleaving the OPU justification overhead corresponding to each channel of OPU payload of ODU signal in OPUk justification overhead of different frames of ODUk signal;

frame interleaving the ODU overhead corresponding to each channel of OPU payload of ODU signal in ODUk overhead of different frames of ODUk signal;

transforming said ODUk signal into an Optical Channel Transport Unit k (OTUk) signal and transmitting said OTUk signal in an OTN;

wherein the index k represents a supported bit rate and the different versions of OPUk, ODUk and OTUk.

A method for transmitting low speed signals in an Optical Transport Network (OTN) includes:

obtaining a multiframe indication upon the completion of Optical Channel Transport Unit (OTU) frame synchronization;

separating Optical Channel Data Unit (ODU) overhead of each channel from an Optical Channel Data Unit k (ODUk) signal according to the multiframe indication;

separating Optical Channel Payload Unit (OPU) justification overhead of each channel from Optical Channel Payload Unit k (OPUk) justification overhead according to the multiframe indication;

separating OPU payload of each channel from the time slots of OPUk payload areas according to the multiframe indication and the payload structure identifier (PSI) corresponding to the multiframe indication; and making a combination of the ODU overhead, OPU justification overhead and OPU payload of each channel to recover an ODU signal, and recover an original low speed signal from the ODU signal.

A device for transmitting low speed signals in an Optical Transport Network (OTN) includes:

more than one synchronization physical interface, for transforming each channel of signal into a Constant Bit Rate (CBR) parallel clock signal and CBR parallel data;

more than one mapping module, for receiving said CBR parallel clock signal and said CBR parallel data sent from said corresponding synchronization physical interface, mapping said parallel clock signal and data into an Optical Channel Payload Unit (OPU) frame, encapsulating the OPU with Optical Channel Data Unit (ODU) overhead, and outputting an ODU parallel clock signal and ODU parallel data;

a multiplexing module, for receiving said ODU parallel clock signal and ODU parallel data sent from said more than one mapping module, interleaving each channel of OPU payload in corresponding time slots of Optical Channel Payload Unit k (OPUk), frame interleaving each channel of OPU justification overhead in the justification overhead of OPUk of different frames according to a multiframe indication, and fulfilling the interleaved multiplexing of all ODU overhead according to the multiframe indication to obtain an ODUk signal and clock signal;

a line module, for receiving said ODUk signal and clock signal sent from the multiplexing module, transforming the ODUk signal into an Optical Channel Transport Unit k (OTUk) signal and outputting the OTUk signal;

a timing generator, for providing a local timing signal for said mapping modules, multiplexing module and line module.

A device for transmitting low speed signals in an Optical Transport Network (OTN) includes:

a line module, for receiving an Optical Channel Transport Unit k (OTUk) signal and transforming said OTUk signal into an Optical Channel Data Unit k (ODUk) signal;

a de-multiplexing module, for receiving said ODUk signal sent from said line module, separating the ODU overhead of each channel from said ODUk signal, separating the Optical Channel Payload Unit (OPU) justification overhead of each channel from the Optical Channel Payload Unit k (OPUk) justification overhead and separating the OPU payload information of each channel from the time slots of OPUks so as to obtain an ODU signal of each channel;

more than one de-mapping module, for respectively receiving ODU signals of all channels which are sent from the de-multiplexing module, recovering a Constant Bit Rate (CBR) parallel clock signal and CBR parallel data;

more than one synchronization physical interface, for respectively receiving said CBR parallel clock signal and CBR parallel data sent from all de-mapping modules and recovering a ultimate client signal CBR;

a timing generator, for providing a local timing signal said de-mapping module, de-multiplexing module and line module.

A device for transmitting low speed signals in an Optical Transport Network (OTN) Includes:

more than one synchronization physical interface, for transforming each channel of Constant Bit Rate (CBR) signal into a CBR clock signal and CBR parallel data; for receiving a CBR parallel clock signal and CBR parallel data and recovering a CBR signal.

more than one mapping/de-mapping module, for receiving the CBR clock signal and CBR parallel data sent from the corresponding synchronization physical interface, mapping the CBR parallel clock signal and CBR parallel data into an Optical Channel Payload Unit (OPU) frame, encapsulating the OPU with Optical Channel Data Unit (ODU) overhead, and outputting an ODU parallel clock signal and ODU parallel data; and for respectively receiving ODU signals of all channels, recovering a CBR parallel clock signal and CBR parallel data from an OPU payload area and obtaining, and sending the recovered CBR parallel clock signal and CBR parallel data to the synchronization physical interfaces;

multiplexing/de-multiplexing module, for receiving said ODU parallel clock signal and ODU parallel data sent from the mapping/de-mapping module, interleaving each channel of OPU payload in corresponding time slots of Optical Channel Payload Unit k (OPUk), frame interleaving each channel of OPU justification overhead in the justification overhead of OPUk of different frames according to a multiframe indication, and fulfilling the interleaved multiplexing of all ODU overhead according to the multiframe indication to obtain an Optical Channel Data Unit k (ODUk) signal and clock signal; and for receiving an ODUk signal, separating the ODU overhead of each channel from the received ODUk signal, separating the OPU justification overhead of each channel from the OPUk justification overhead and separating the OPU payload information of each channel from the time slots of OPUks so as to obtain an ODU signal of each channel, and sending the obtained ODU signal to the mapping/de-mapping module;

a line module, for receiving said ODUk signal and clock signal sent from said multiplexing/de-multiplexing module, transforming said ODUk signal into an OTUk signal and outputting the OTUk signal; for receiving an Optical Channel Transport Unit k (OTUk) signal, transforming the received OTUk signal into an ODUk signal, and sending the ODUk signal to said multiplexing/de-multiplexing module;

a timing generator, for providing a signal for said mapping/ de-mapping modules, multiplexing/de-multiplexing module and line module.

It can be seen from the above that, in accordance with embodiments of the invention, when a low speed signal is sent, after the low speed signal is asynchronously mapped into an OPU, OPU payload is synchronously multiplexed into an ODU1 in byte interleaved multiplexing mode, while OPU and ODU overhead are multiplexed into an ODU1 in a frame interleaved multiplexing mode, thereby reducing the extra bandwidth consumption during the ODU multiplexing process of the low speed signal so that the entire information of the low speed signal is completely reserved. When the signal is received, the complete recovery of the original low speed signal is implemented via the inverted process of the multiplexing process. Thus, the timing non-transparency problem in the previous technical solution of the Transparent Multiplexer (TMUX) is solved without the intervention of the overhead of the client signal and without complicated processing procedure, thereby ensuring the integrity of the client signal. In addition, signals of each channel may reserve the information of synchronous state after passing the multiplexing unit in accordance with embodiments of the invention, which is a good support for synchronous networking by using SDH.

The problem is solved as well that the transparent transmission of the CBR155 and CBR622 signals in the OTN can not be implemented by utilizing the existing multiplexing solution in G709, while there is also an end-to-end performance management ability for the low speed CBR signal. For point-to-point applications, the flexibility for client access and the utilization ratio of bandwidth are improved and the transfer of the data services such as GE may also be implemented by utilizing the virtual concatenation. The bandwidth can be further saved by adapting GE into an ODU155-7V based on the GFP protocol.

Furthermore, because there is no complicated pointer processing procedure of channel signals, hardware implementation is relatively simple.

DETAILED DESCRIPTION OF THE PREFERRED EMBODIMENTS

Embodiments of the invention provide a method for transmitting low speed signals in an OTN, including: separately adapting a low speed signal of each channel to be multiplexed to an ODU signal at the same grade as that of the low speed signal so as to obtain OPU payload, OPU justification overhead and ODU overhead corresponding to each ODU signal; evenly dividing each OPUk payload area into one or more time slots, byte interleaving the OPU payload in the time slots of the OPUk payload area and identifying the type of OPU payload, the size and location of the time slot occupied by each channel of OPU payload according to a PSI corresponding to a multiframe indication; frame interleaving the OPU justification overhead corresponding to each channel of OPU payload in OPUk justification overhead of different frames according to the multiframe indication; frame interleaving the ODU overhead corresponding to each channel of OPU payload in ODUk overhead of different frames according to the multiframe indication, thereby forming an ODUk signal; transforming the ODUk signal into an OTUn signal, and then transmitting the OTUn signal in an OTN.

An embodiment of the invention is hereinafter described in detail with reference to the accompanying drawings by taking CBR155 and CBR622 signals as examples.

In the description below, in order to make description easy, CBR-M will be used to represent a low speed signal such as CBR155 or CBR622 signal.

First, it is necessary to define a new OPU-M and ODU-M structure for mapping a low speed CBR-M signal.

Figures 1, 2:
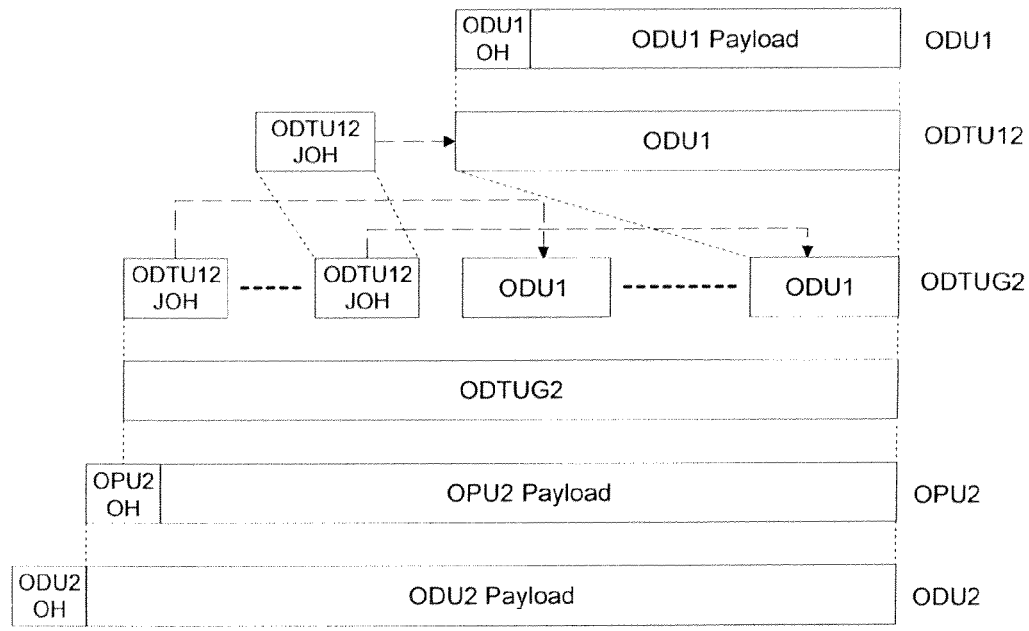
FIG. 1 is a schematic drawing illustrating the frame structure of an OPU1 in the prior art.
FIG. 2 is a schematic drawing illustrating the solution for multiplexing an OPU1 into an ODU2 in the prior art.
Figure 3:
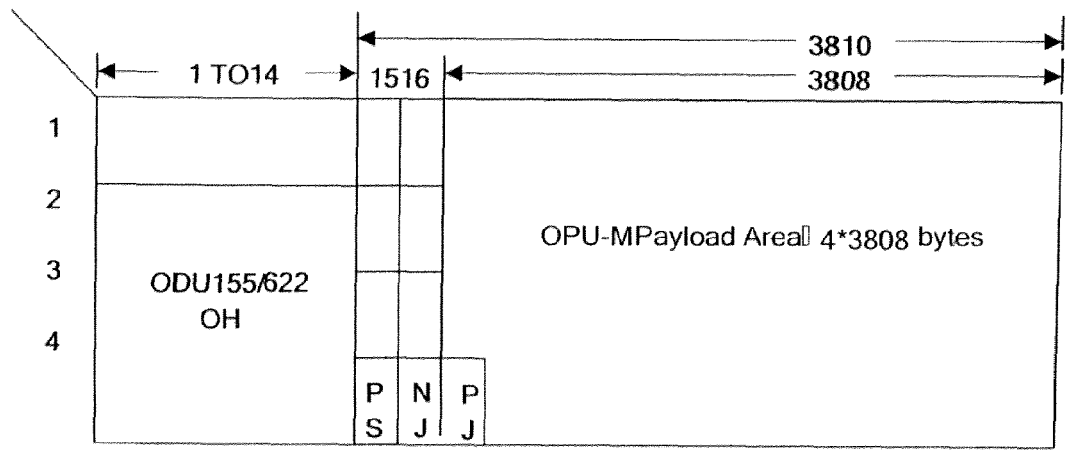
FIG. 3 is a schematic drawing illustrating the ODU155/ ODU622 frame structure according to an embodiment of the invention.

See also the frame structure of ODU-M for mapping CBR-M signal as shown in FIG. 3. Columns 1 to 14 are ODU-M overhead area, Columns 15 and 16 are OPU-M overhead area, and Columns 17 to 3824 form an OPU-M payload area which includes 4×3808 bytes. A Positive Justification (PJ) byte is located at the first location in row 4 of the payload area; a Negative Justification (NJ) byte is located at the location in column 16 of row 4 in FIG. 3. A ±65 ppm frequency difference may be tolerated by positive and negative justification, and with the bit-rate tolerance of ±20 ppm for local timing of equipment, the bit-rate tolerance of CBR155 and CBR622 client signals may be ±45 ppm. The bytes in rows 1, 2 and 3 of column 16 are justification control (JC) bytes, whose function and definition are the same as that in recommendation G.709. From above it is observed that the OPU-M and ODU-M structure newly defined is substantially the same as that of the OPUk in recommendation G.709 except that the rate of the OPU1 payload area is 2488320 Kbits/s±20 ppm, while in embodiments of the invention, the rate of the OPU622 payload area is 622.08 Mbit/s±20 ppm and the rate of the OPU155 payload area is 155.52 Mbit/s±20 ppm, i.e. the signal format is substantially the same while the repetition period is different.

In FIG. 3, when the client signal is a CBR155 signal, the OPU-M is an OPU155; when the client signal is a CBR622 signal, the OPU-M is an OPU622.

According to the OPU-M and ODU-M structure defined above, the CBR155/622 signal may be mapped into the OPU155/622 and ODU155/622.

Suppose that each channel of signal to be multiplexed has a single rate, the signal multiplexing process in the sending direction includes the following steps.

Step 1: mapping each channel of CBR-M signal into an ODU-M signal to form N channels of OPU-M payload and OPU-M justification overhead as well as N channels of ODU-M overhead.

In terms of CBR622 signal, for example, asynchronously map each channel of CBR622 signal into the OPU622 with a structure as shown in FIG. 3, and then encapsulate the OPU622 with ODU622 overhead to form an ODU622 signal. In this way, OPU622 payload and OPU622 justification overhead as well as the ODU622 overhead may be obtained. Wherein, there are 4 channels of CBR622 signals.

The signal adaptation process for the CBR155 signal is exactly the same as that for the CBR622 signal. Wherein, there are 16 channels of CBR155 signals.

Step 2: divide each OPU1 payload area into several time slots; byte interleave each channel of low speed OPU-M payload as obtained by Step 1 in the time slots; identify the type of OPU-M payload, the size and location of the time slot occupied by each channel of OPU-M payload respectively using the payload type indication and reserved bytes in the PSI corresponding to the multiframe indication.

Figure 4:
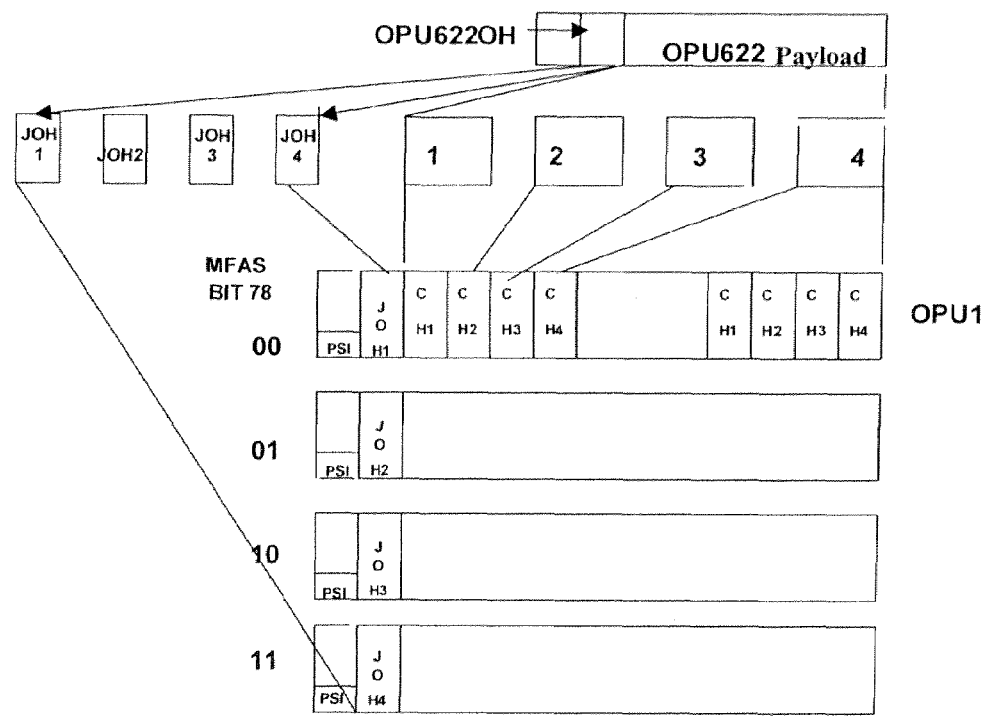
FIG. 4 is a schematic drawing illustrating OPU1 time slot dividing and justification overhead multiplexing.

FIG. 4 is a schematic drawing illustrating OPU1 time slot dividing and justification overhead multiplexing by taking the mapping of a CBR622 signal into an OPU1 as an example.

Divide each OPU1 payload area into 4 time slot areas. There are 3808/4□952 columns for each time slot, and it needs 4 OPU1 frames to carry 4 channels of OPU622 payload.

Then, put 4 channels of OPU622 payload in corresponding time slots in a byte interleaved mode, for example; put the OPU622 payload of channel 1 in the CH1 time slot of the OPU1 payload area, . . . , and the like, and put the OPU622 payload of channel 4 in the CH4 time slot of the OPU1 payload area.

In addition, it is also necessary to provide the payload type indication and the reserved bytes distributed in different frames, which belong to the PSI corresponding to the multiframe indication, to respectively identify the type of OPU-M payload, the size and location of the time slot occupied by each channel of OPU-M payload. In the sending direction, a multiframe signal is generated locally, 256 frames constitute a multiframe, and the multiframe signal generated may be transferred by utilizing the multiframe alignment signal (MFAS) bytes defined in an OTU frame or other undefined reserved bytes, and used as the multiframe indication. A payload type indication may use the PSI byte corresponding to the multiframe indication equal to 0 as defined in G.709, namely the Payload Type (PT) byte, wherein the PT byte provides altogether 256 codes; some of which have been defined by G.709, while the others are reserved codes (RES codes) which may be used to define a new payload type.

The PSI byte is indicated by an MFAS, which has 8 bits and may be used for indicating altogether 256 PSI bytes, including the PT byte defined in G.709 and the PSI reserved bytes not yet defined which are distributed in other frames. Thus, the reserved bytes (RES byte) not yet defined of the PSI at present may be utilized to indicate the location and size of time slot occupied by each channel of OPU payload.

Certainly, the reserved bytes (RES byte) not yet defined of a PSI at present may also be utilized to indicate the payload type.

As shown in FIG. 4, for the CBR622 signal, 2-bit multiframe indication bits are needed, which indicates that 4 OPU1 frames are needed to transfer 4 OPU622 frames which belong to 4 channels of OPU622s respectively, and are also corresponded to PSI bytes in 4 different OPU1 frames. These PSI bytes are enough to define the payload type indication and the time slot location indication of each channel of OPU payload.

For the CBR155 signal, divide the OPU1 payload area into 16 time slot areas. For each time slot there are 3808/16=238 columns. Successively put 16 channels of OPU155 payload in CH1 to CH16. In addition, provide 4-bit multiframe indication bits, namely bits 5, 6, 7 and 8 of MFAS, for implementing the multiframe indication, indicating that 16 OPU1 frames are needed to transfer 16 OPU155 frames which belong to 16 channels of OPU622s respectively. The 4-bit multi-frame indication is also corresponded to the PSI bytes in 16 different OPU1 frames, which are enough to define the payload type indication and the time slot location indication of each channel of OPU payload.

Step 3: frame interleave the OPU-M justification overhead of each channel obtained in Step 1 in the OPU1 justification overhead of different frames according to the multiframe indication.

As shown in FIG. 4, the OPU622 justification overhead of channel 1 is frame multiplexed into the justification overhead of the OPU1 frame corresponding to the MFAS equal to 00, . . . , and OPU622 justification overhead of channel 4 is frame multiplexed into the justification overhead of the OPU1 frame corresponding to the MFAS equal to 11.

In the case of CBR155 signal, OPU155 justification overhead of channel 1 is frame multiplexed into the justification overhead of the OPU1 frame corresponding to the MFAS equal to 0000, . . . , and OPU155 justification overhead of channel 16 is multiplexed into the justification overhead of the OPU1 frame corresponding to the MFAS equal to 1111.

Step 4: frame interleave the ODU-M overhead of each channel, which is obtained in Step 1, in the ODU1 overhead of different frames according to the multiframe indication to form an ODU1 signal, turn the ODU1 signal into an OTUk signal and transfer the OTUk signal in an OTN.

Figure 5:
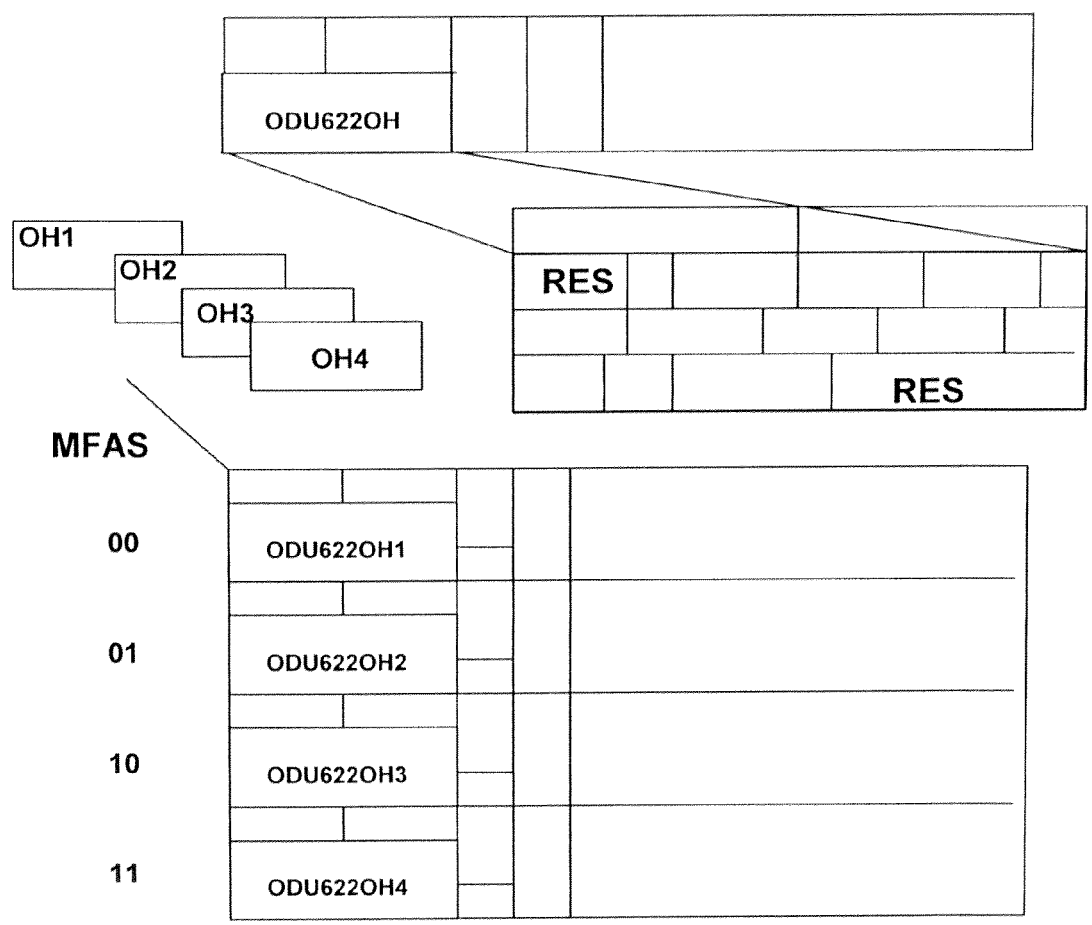
FIG. 5 is a schematic drawing illustrating the multiplexing from ODU622 overhead into ODU1 overhead.

The process of multiplexing the ODU622 overhead into the ODU1 overhead will be described with reference to FIG. 5 and FIG. 6.

For ODU622, the OPU622 overhead of channel 1 is frame multiplexed into the ODU1 overhead in the ODU1 frame corresponding to the MFAS equal to 00, . . . , and the ODU622 overhead of channel 4 is multiplexed into the ODU1 overhead in the ODU1 frame corresponding to the MFAS equal to 11.

Similarly, if the signal to be multiplexed is the CBR155 signal, ODU155 overhead of channel 1 is frame multiplexed into the ODU1 overhead in the ODU1 frame corresponding to the MFAS equal to 0000, . . . , and the ODU155 overhead of channel 16 is multiplexed into the ODU1 overhead in the ODU1 frame corresponding to the MFAS equal to 1111.

The byte definition of ODU622 overhead is the same as that of the ODU1 overhead as recommended in G.709. FIG. 6 is a schematic drawing illustrating the frame structure of ODUk overhead. The first 14 columns of row 1 is the reserved row for OTUk, in which columns 1 to 7 are Frame alignment overhead bytes, columns 8 to 14 are OTUk overhead bytes. All bytes in the first 14 columns from row 2 to row 4 are ODUk overhead bytes with the ODU622/155 overhead mapped into this area according to the corresponding multiframe indication, wherein PM is a performance monitoring overhead field used to implement the end-to-end performance monitoring. Columns 15 and 16 of row 1 to row 4 are OPUk overhead bytes.

After the multiplexing process into the ODU1 signal is fulfilled, when a line transmission is made, in general it is also necessary to turn the ODU1 signal into an OTU1 signal by adding OTU1 overhead to the ODU1 signal, make a FEC coding in compliance with ITU-T G.709, generate a frame alignment signal and multiframe alignment signal, perform a scrambling process as specified in G.709, and output the resultant signal to transmission line of an OTN for transmission upon the electro/optic conversion of the resultant signal.

As a result of such multiplexing operation, the ODU1 overhead is made up of the ODU622/ODU155 overhead of all channels, and the ODU1 overhead of each frame actually transfers the overhead of each ODU622 or ODU155, namely the overhead of ODU1 itself has already been occupied by the overhead of each low speed ODU, which is essentially different from G.709. In accordance with G.709, 4 ODU1s are put in high speed OPU2 payload areas, for example, 4 ODU1s including ODU1 overhead and OPU1 payload are entirely assigned in the OPU2 payload area. In contrast, in accordance with an embodiment of the invention the OPU622 payload areas of the ODU622 is put in OPU1 payload areas with ODU622 overhead areas put in ODU1 overhead areas so as to save the bandwidth and make it possible to implement the synchronous multiplexing of 4 ODU622s into an ODU1. At the same time, because there is an ODU management overhead in each low speed channel, it is possible to support end-to-end performance monitoring and management for each low speed service.

According to the multiplexing process of an embodiment of the invention, end-to-end QOS management of service signals is implemented via the overhead of an ODU622 or ODU155.

In the application of point-to-point system, according to an embodiment of the invention, the rate of an ODU622 or ODU155 depends on the originating timing of a network element, the rates of all the ODUk signals at the same level are identical, and the phases of frame synchronization and multiframe synchronization signals are also identical. Although all ODU155 signals or all ODU622 signals are identical in rate and phase, the mapping of CBR155/622 into OPU155/622 is an asynchronous mapping; therefore, the rate in each channel is independent from others with the information therein fully reserved so as to ensure the timing transparency of the rate of each channel.

It can be seen from the above that the ODU multiplexing solution proposed in an embodiment of the invention includes, in nature, that a CBR is asynchronously mapped into an OPU and then an ODU is synchronously multiplexed into an ODU1, or in short OPU payload is multiplexed in the byte interleaving manner and OPU/ODU overhead in the frame interleaving manner. Different from G.709, the ODU overhead is not asynchronously multiplexed into the OPU payload along with the ODU payload but multiplexed to the ODU1 overhead in the frame multiplexing manner.

The signal transferred in a multiplexing manner has to be de-multiplexed when received so as to fully recover the original low speed signal before multiplexed. The de-multiplexing process is the inverted process of multiplexing, which is hereinafter described briefly taking the CBR155 and CBR622 as an example.

After OTU1 frame synchronization is fulfilled, a multiframe indication of the ODU1 signal may be obtained.

Separate the ODU-M overhead of each channel from the ODU1 signal according to the multiframe indication.

Separate the OPU-M justification overhead of each channel from OPU1 justification overhead according to the multiframe indication.

Separate the OPU-M payload of each channel from the time slots in the OPU1 payload area according to the multiframe indication.

Make a combination of the ODU-M overhead, OPU-M justification overhead and OPU-M payload separated in the above steps to recover an ODU-M signal, and restore the ODU-M signal to the low speed signal of the original CBR-M type.

Figures 6, 7:
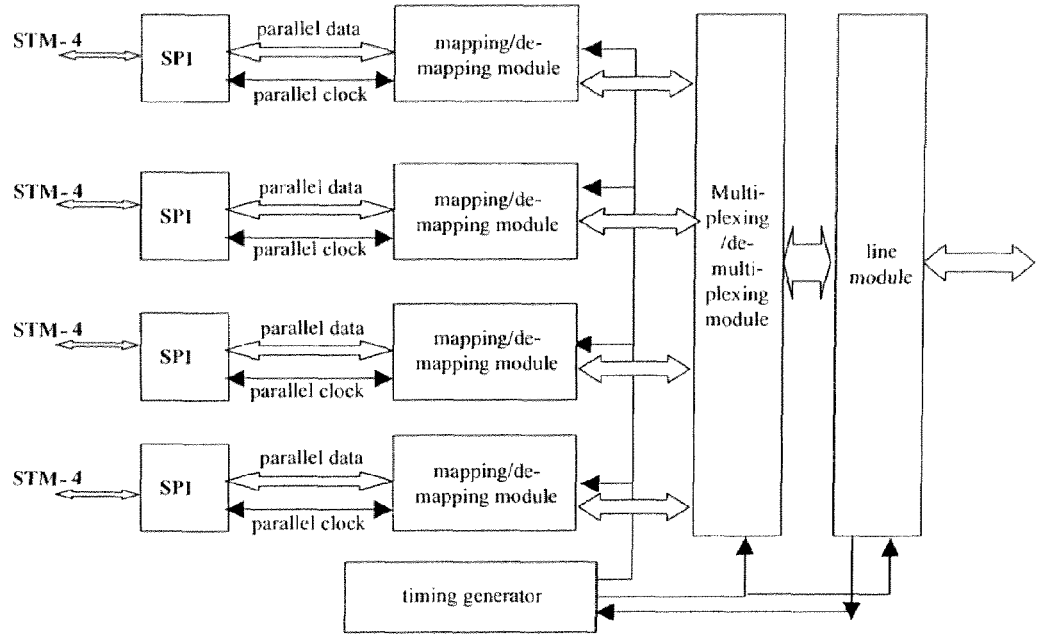
FIG. 6 is a schematic drawing illustrating the structure of ODUk overhead.
FIG. 7 is a schematic drawing illustrating the structure of the multiplexing/de-multiplexing device between a CBR622 and an ODU1 in accordance with an embodiment of the invention.

Based on the above multiplexing/de-multiplexing method for the low speed signal, the structure of a multiplexing/de-multiplexing device for implementing CBR622 signal transparent transmission according to an embodiment of the invention is shown in FIG. 7, which is also called the Sub-rate Transparent Multiplexer (STMUX) in an embodiment of the invention because the device can implement the transparent transmission of each sub-rate signal of the signal to be multiplexed. The device includes 4 synchronization physical interfaces (SPIs), 4 mapping/de-mapping modules, and a multiplexing/de-multiplexing module, a line module and a timing generator.

In the sending direction of signals, the device is used for implementing the multiplexing process.

The signal in each channel first enters each SPI, for example, 4 channels of SPIs, fulfill optic/electro conversion, clock signal and data recovery, and serial/parallel conversion respectively, and then each channel of parallel signal is outputted to each of the mapping/de-mapping modules. For CBR622 signal, the output parallel signal may be 77.76M parallel data and a clock signal.

The mapping/de-mapping module receive the data sent from the SPI, and the parallel clock signal sent from the SPI or a timing generator, maps the received data into the OPU622 frame, where the OPU622 frame uses a local timing signal and the frames of 4 OPU622 signals have the identical frequency and phase; the frequency difference between the received data and the local clock signal is justified by the Positive/Negative justification Opportunity of the OPU622. Meanwhile, the module encapsulates OPU622 with ODU622 overhead, and eventually outputs the ODU622 parallel data and clock signal to the mapping/de-mapping module.

The multiplexing/de-multiplexing module receives the data sent from 4 channels of mapping/de-mapping modules and the clock signal generated by the timing generator, interleaves the 4 channels of OPU622 payload signals in the 4 time slots of the OPU1, while frame interleaves each channel of OPU622 justification overhead in the OPU1 justification overhead. For example, interleave the OPU622 justification overhead of channel 1 in the justification overhead of the OPU1 frame corresponding to the MFAS equal to 00, interleave the OPU622 justification overhead of channel 2 in the justification overhead of the OPU1 frame corresponding to the MFAS equal to 01, . . . , and interleave the OPU622 justification overhead of channel 4 in the justification overhead of the OPU1 frame corresponding to the MFAS equal to 11. The multiplexing/de-multiplexing module simultaneously fulfills the interleaved multiplexing of each channel of ODU622 overhead, for example, multiplexes the ODU622 overhead of channel 1 into the ODU1 overhead of the ODU1 frame corresponding to the MFAS equal to 00, . . . , and multiplexes the ODU622 overhead of channel 4 into the ODU1 overhead of the ODU1 frame corresponding to the MFAS equal to 11.

Eventually, the ODU1 signal and the clock signal generated by the timing generator are sent to the line module, the line module generates OTU1 overhead in compliance with G.709 to transform the ODU1 signal into an OTU1 signal, makes a FEC coding in compliance with ITU-T G.709, generates a frame alignment signal and multiframe alignment signal, performs a scrambling process as specified in G.709, and then outputs the signal after electro/optic conversion so as to complete the entire multiplexing process.

In this process, according to the location where STMUX is located in an OTN and the different functions thereof, the timing generator generates local timing signals including the clock signal, frame alignment and multiframe alignment signals directly or according to the signals such as the clock signal and frame alignment signal received from the multiplexing/de-multiplexing module, and outputs the local timing signals to the mapping/de-mapping module, multiplexing/de-multiplexing module and line module. In detail, if the STMUX is located at the source site where a signal is generated, the timing generator of the STMUX will directly generate the local timing signal, and the mapping/de-mapping module receives the timing signal generated by the local timing generator; otherwise, the timing generator generates the local timing signal according to the clock signal and frame alignment signal separated from the data by the de-multiplexing module, and the mapping/de-mapping module receives the clock signal sent from the SPI together with the data as well as the timing signal generated by the local timing generator.

In the receiving direction of signals, a de-multiplexing process opposite to the sending direction is fulfilled.

The line module receives signals and fulfills the functions such as an optic/electro conversion, OTU1 clock signal and data recovery, OTU1 frame alignment, de-scrambling, FEC decoding and OTU1 overhead termination; separates the ODU1 signal, clock signal, and frame alignment signal and multiframe alignment signal and the like, and sends the signals to the multiplexing/de-multiplexing module. The clock signal is also sent to the timing generator; and in the receiving direction, the de-multiplexing process adopts a line timing manner.

The multiplexing/de-multiplexing module fulfills the de-multiplexing process of the ODU1 signal, separates the ODU622 overhead of each channel from the ODU1 signal according to the multiframe indication, separates each OPU622 justification overhead from OPU1 justification overhead according to the multiframe indication, and separates the OPU622 payload information of each channel from OPU1 time slots according to the multiframe indication and the PSI corresponding to the multiframe indication. In this way, 4 channels of complete ODU622 signals are separated from the ODU1 signal and sent to the mapping/de-mapping modules.

The mapping/de-mapping modules fulfill the termination of the ODU622 signals, recover simultaneously various CBR622 information from OPU622 payload areas, wherein the control of accessing payload information has to be made according to justification control bytes, and smooth filtering of the clock signal is conducted. The parallel CBR622 data and parallel clock signal are recovered and sent to SPI modules.

The SPI modules receive the data and clock signal sent from the mapping modules, makes parallel/serial and electro/optic conversion and recovers the final client signal CBR622.

The timing generator generates a local timing signal according to the signals such as the clock signal and frame alignment signals sent from multiplexing/de-multiplexing module, and outputs the signals to the multiplexing/de-multiplexing module, mapping/de-mapping modules and line module.

Figure 8:
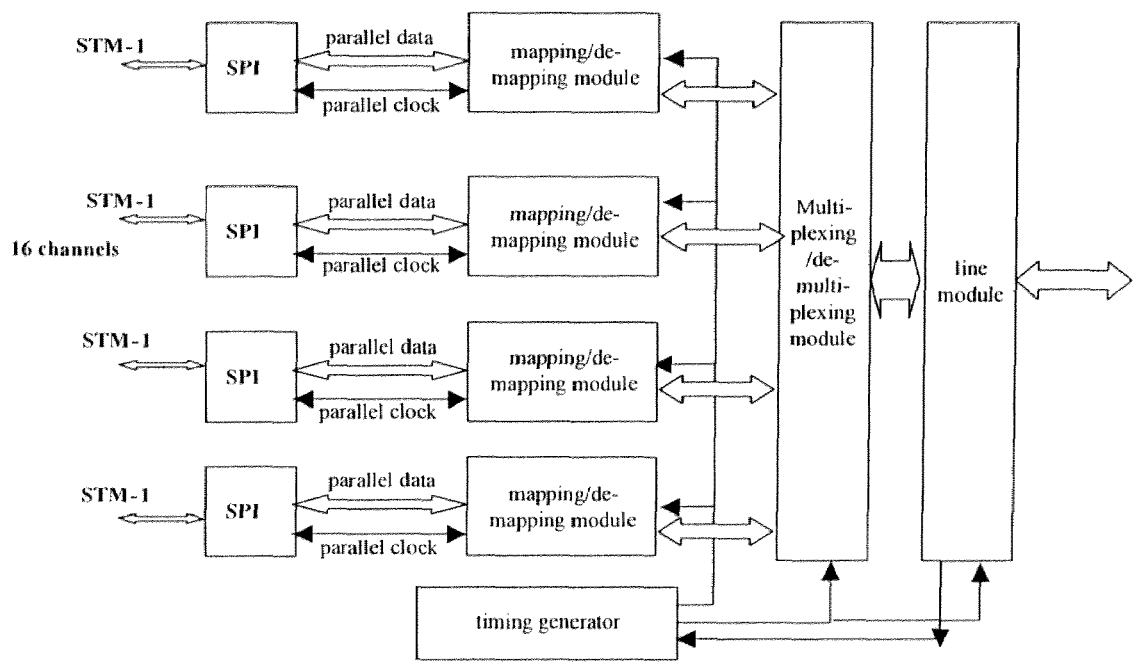
FIG. 8 is a schematic drawing illustrating the structure of the multiplexing/de-multiplexing device between a CBR155 and an ODU1 in accordance with an embodiment of this invention.

Refer to FIG. 8, which illustrates an embodiment of the invention for multiplexing and de-multiplexing 16 channels of CBR155s into an ODU1/OTU1. The structure and operational principle of the embodiment is the same as those in FIG. 7, except that the number of the channels is 16, so the numbers of the corresponding SPIs and mapping/de-mapping modules are 16, respectively.

In addition, by the solution in accordance with an embodiment of the invention, multiplexing and de-multiplexing for two or more signals of different rates may be made so as to implement the transparent transmission of signals of different rates in an OTN.

The solution for simultaneous multiplexing/de-multiplexing of CBR155 and CBR622 is hereinafter described.

Figure 9:
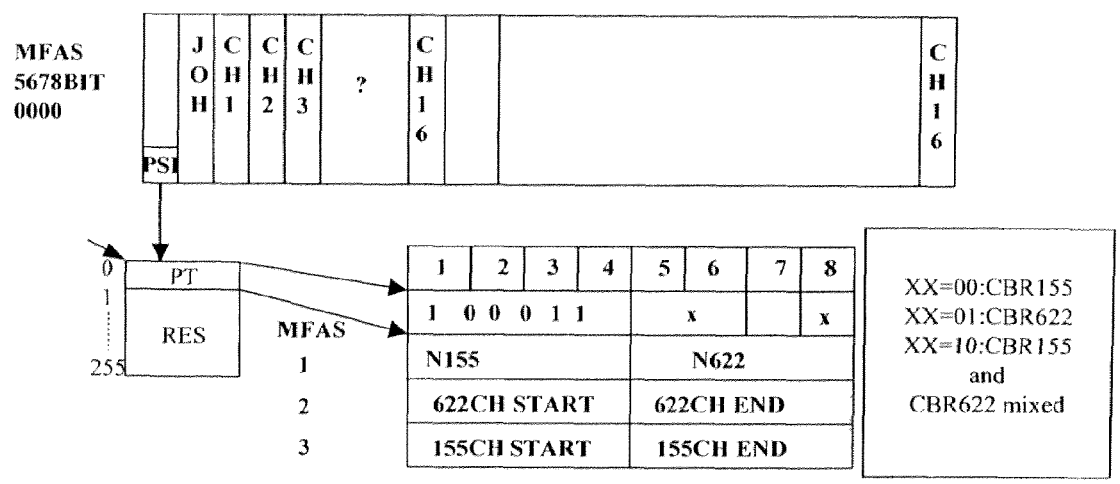
FIG. 9 is a schematic drawing illustrating the time slot dividing for the hybrid multiplexing of a CBR155 and a CBR622.

As shown in FIG. 9, for CBR155 and CBR622 hybrid multiplexing, an OPU1 payload area is still evenly divided into 16 time slots with 4 time slots occupied by each OPU622 payload and one time slot occupied by each OPU155.

The hybrid multiplexing process of CBR155 and CBR622 into ODU1/OTU1 is as follows.

The client signals, N channels of CBR155 signals and M channels of CBR622 signals, are asynchronously mapped into N channels of OPU155/ODU155 and M channels of OPU622/ODU622, respectively.

2) Take the greatest common divisor of the rates of CBR622 and CBR155 signal, namely the value of the rate of CBR155, as a base unit, and divide an OPU1 payload area into N+4×M time slots; the N channels of OPU155 payload and M channels of OPU622 payload are respectively put in time slots of OPU1 with 4 time slots occupied by one channel of OPU622 payload and one time slot occupied by one channel of OPU155 payload.

3) Set a PSI value of the OPU1 frame corresponding to the MFAS equal to 0, namely the PT value, identify the payload type by utilizing reserved codes of the PT; and respectively indicate the number and time slot location of each channel of payload by utilizing the PSI bytes of the OPU1 frame corresponding to the MFAS equal to 1 to L, where L is less than 255.

As shown in FIG. 9, here the reserved codes of the PT in the PSI is used to indicate the type of OPU-M payload, and the PSI bytes corresponding to the multiframe indication equal to other values, namely reserved bytes of the PSI, is used for indicating the size and location of time slot occupied by each channel of OPU payload. Therefore it is necessary to define new contents of RES codes of the PT. The PT is an 8-bit byte, and according to the definition in G.709, 80H to 8FH are reserved for indication codes, of which a portion may be taken to indicate the payload type, for example, as defined, contents 8CH, 8DH and 8EH of PT corresponding to the MFAS equal to 00000000 are respectively used to indicate the three occasions wherein the payload type is a single CBR155, a single CBR622, and a combination of CBR155 and CBR622, respectively. The PT contents is located in column 15 of row 4 in the OTU frame structure; meanwhile, the first 4 bits of the PSI byte in the OPU1 frame corresponding to the MFAS equal to 1 are used to indicate the number of CBR155, and the last 4 bits thereof to indicate the number of CBR622.

The sum of the rates of N channels of CBR155 and M channels of CBR622 shall be an equivalent rate of one CBR2G5, where both N and M are nature number, for example, N=4, M=3; or N=8, M=2; N=16, M=0; N=0, M=4.

In addition, a portion may also be taken from the PSI bytes of the OPU1 frame corresponding to the MFAS equal to 2 to 255 to indicate the locations of the CBR155 and CBR622 in the OPU1 payload area, for example, the first 4 bits of the PSI corresponding to the MFAS equal to 2, namely 000000010, may be used to indicate the beginning time slot location of the CBR622 in the OPU1 and the last 4 bits of PSI indication to indicate the ending time slot location of the CBR622 in the OPU1; the first 4 bits of the PSI corresponding to the MFAS equal to 3 may be used to indicate the beginning time slot location of the CBR155 in OPU1, and the last 4 bits may be used to indicate the ending time slot location of the CBR155 in OPU1.

The above time slot dividing, payload type identifying and payload time slot indicating are an example. The time slot location of each channel of payload in OPU1 may also be indicated by utilizing multiple frames of PSI bytes corresponding to the MFAS. In short, the reserved codes of the PT are enough to identify the payload type, and the PSI bytes in other frames indicated by the MFAS may be used for identifying the number of the payload and the time slot location of each channel of payload.

In addition, other reserved bytes distributed in different frames may be used for indicating the type of OPU-M payload, the size and location of the time slot occupied by each channel of OPU-M payload by defining an appropriate code. And the same result as the above may be achieved.

4) Frame multiplex N channels of OPU155 justification overhead and M channels of OPU622 justification overhead into the justification overhead in the OPU1 frame according to the multiframe indication.

5) Frame multiplex N channels of ODU155 overhead and M channels of ODU622 overhead into the ODU1 overhead according to the multiframe indication.

After the multiplexing into an ODU1 signal is fulfilled, it is in general necessary, as the process of the above single rate signal, to transform the ODU signal into the an OTU1 signal when line transmission is made by adding OTU1 overhead to the ODU1 signal, as well as make a FEC coding in compliance with ITU-T G.709, generate a frame alignment signal and multiframe alignment signal, perform a scrambling process as specified in G.709, and output the resultant signal to the transmission line of an OTN for transmission after a electro/optic conversion.

The de-multiplexing process, as the process of the above single rate signal, is an inverted process of the multiplexing process. The de-multiplexing process of the ODU1 signal obtained by the hybrid signal multiplexing of the CBR155 and CBR622 is hereinafter described briefly.

After OTU1 frame synchronization is fulfilled, a multiframe indication of the ODU1 signal may be obtained.

Separate the ODU155/622 overhead of each channel from the ODU1 signal according to the multiframe indication.

Separate the OPU155/622 justification overhead of each channel from OPU1 justification overhead according to the multiframe indication.

Separate the OPU155/622 payload of each channel from the time slots of each OPU1 payload area according to the multiframe indication and the PSI corresponding to the multiframe indication.

Make a combination of the ODU155/622 overhead, OPU155/622 justification overhead and OPU155/622 payload separated in the aforesaid steps to recover an ODU155/622 signal, and recover the low speed CBR155/622 signal of the original type from the ODU155/622 signal.

Figure 10:
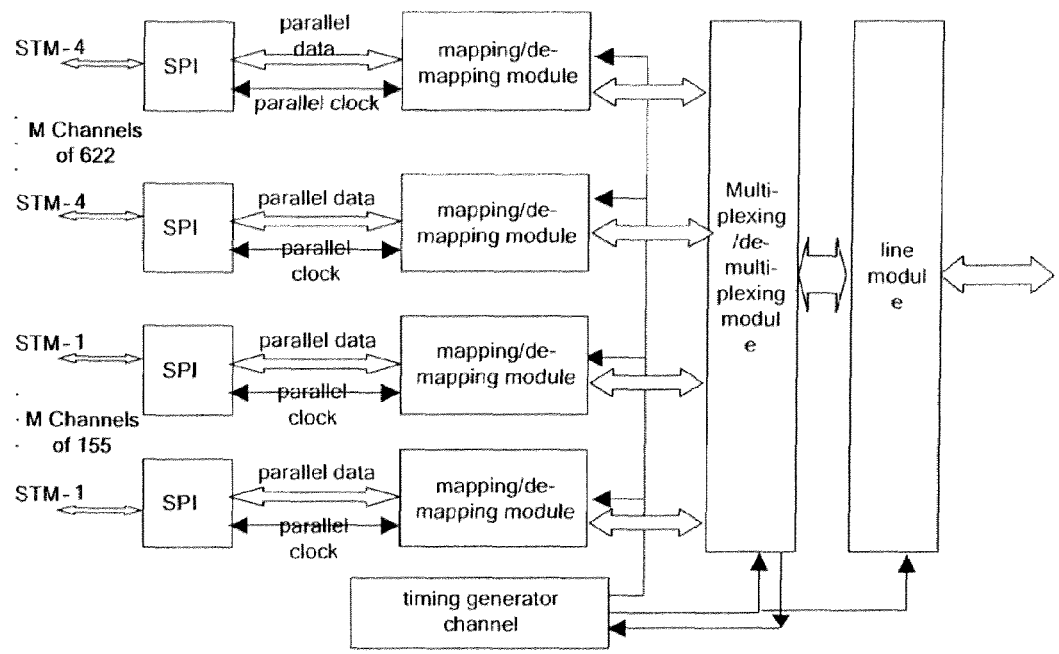
FIG. 10 is a schematic drawing illustrating the structure of the multiplexing/de-multiplexing device for the hybrid signal multiplexing of M channels of CBR622s and N channels of CBR515s.

Refer to FIG. 10 for the device of multiplexing/de-multiplexing the hybrid signal of CBR155 and CBR622.

In the sending direction, the serial data and serial clock signal are recovered from the client signal CBR155 and CBR622 via the respective SPI; then the serial/parallel conversions of the serial data and serial clock signal are performed; and the parallel data and parallel clock signal are output to the respective OPU155/OPU622 multiplexing/de-multiplexing modules.

The mapping/de-mapping module is used for mapping parallel CBR155 signals into OPU155 signals, implementing a rate justification, and adding ODU155 overhead; and the mapping/de-mapping module is used for mapping parallel CBR622 signals into the OPU622 signals, implementing a rate justification, and adding ODU622 overhead. The originating timing of OPU155/ODU155 and OPU622/ODU622 is the local timing, which is generated by the local timing generator with the frequency bias less than ±20 ppm.

The method for multiplexing OPU155/622 into OPU1 by the multiplexing/de-multiplexing module is similar to the aforesaid method, where the payload of each OPU155 and each OPU622 are assigned to the respective time slot. Insert a PSI to indicate the payload type and respective number of channels of CBR155 and CBR622, N and M; and use the reserved byte of the PSI to indicate the time slot location of each channel of payload. For the multiplexing of justification overhead, as the time slot number is the same as the value of multiframe indication which is needed; for example, OPU1 is divided into 16 time slots and it needs 16 OPU1 frames to transfer N channels of OPU155s and M channels of OPU622s, the justification overhead location of the OPU1 frame corresponding to the MFAS which is identical to the time slot location indication indicated by the PSI, may be utilized to load the corresponding N channels of OPU155 justification overhead and M channels of OPU622 justification overhead. For the multiplexing of ODU155/622 overhead into ODU1 overhead, just as the indication of the justification overhead multiplexing, the ODU1 location of the ODU1 frame corresponding to the MFAS which is identical to the time slot location indication indicated by the PSI (for example, if the time slot location indication is 5, the MFAS is 5), may be utilized to load the corresponding N channels of ODU155/622 overhead and M channels of ODU622 overhead.

Eventually, the ODU1 signal and the clock signal generated by the timing generator are sent to the line module; the line module generates OTU1 overbead in compliance with the G.709, transforms the ODU1 signal into an OTU1 signal, makes a FEC coding in compliance with ITU-T G.709, generates a frame alignment signal and multiframe alignment signal, performs a scrambling process as specified in G.709, and outputs the signal after an electro/optic conversion so as to complete the entire multiplexing process.

In the aforesaid embodiments of the invention, the low speed signals such as an OPU155 and OPU622, apart from being transformed into an OPU1, may be transformed into other OPUk signals such as OPU2 and OPU3 of higher rate, and further transformed into the corresponding ODUk signals. When transfer is made in the OTN, apart from being transformed into the OTUk of the same rate by adding the OTUk overhead, multiple channels of ODUk may be multiplexed into an ODUn signal of higher rate, and OTUn overhead is added to the ODUn signal to form an OTUn; for example, 4 channels of ODU1s may be multiplexed into an ODU2, and OTU2 overhead is added to the ODU2 to form an OTU2, or 16 channels of ODU1s may be multiplexed to an ODU3, and OTU3 overhead is added to the ODU3 to form an OTU3, and so on.

Below are some examples of the application in accordance with embodiments of the invention.

Figure 11:
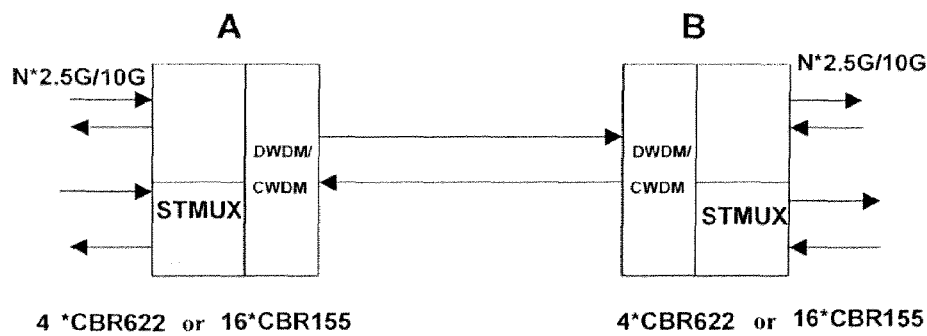
FIG. 11 is a schematic drawing illustrating the network topology structure for using the sub-rate transparent multiplexer in the point-to-point transfer for the DWDM/CWDM system in accordance with an embodiment of the invention.

1) Point-to-point transfer in a DWDM/CWDM system:

as shown in FIG. 11, the STMUX provided in accordance with an embodiment of the invention is set in nodes A and B respectively, and the STMUX may fulfill the transparent multiplexing of multiple channels of CBR622 or CBR155 signals. In this way, in a data transmission process between point A and point B, multiple sub-rates signals occupy one wavelength, and are transferred in the same optical fiber along with the wavelengths of other modulated rates. The DWDM system in use may include one or more STMUX BoardCards.

Figure 12:
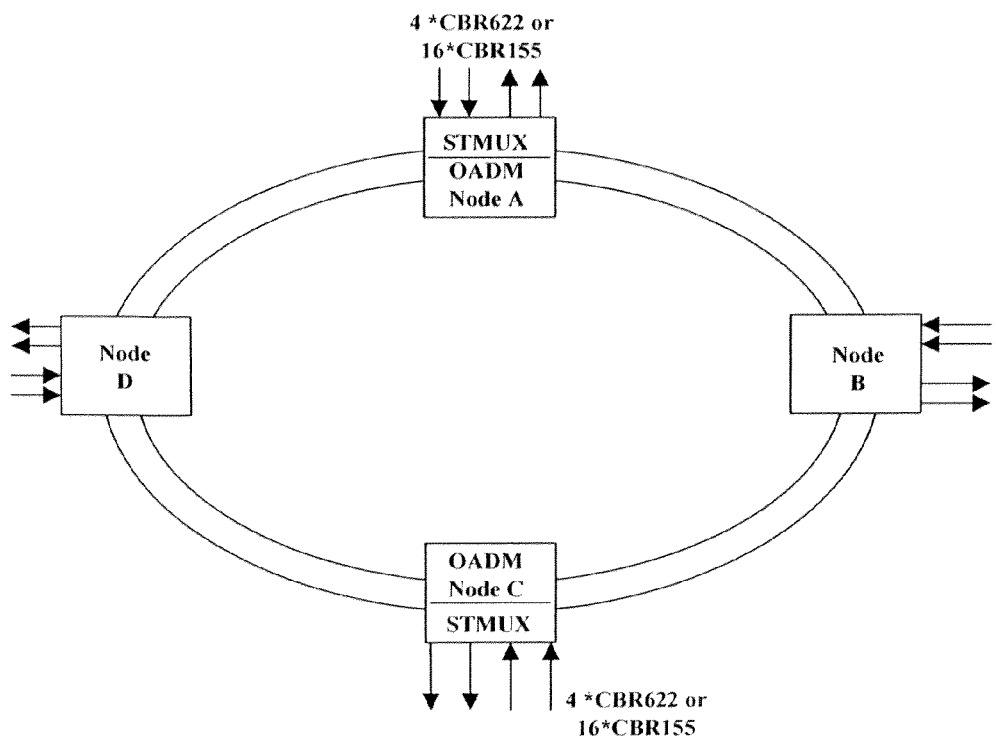
FIG. 12 is a schematic drawing illustrating the network topology structure for using the sub-rate transparent multiplexer in the metropolitan area OADM ring network in accordance with an embodiment of the invention.

2) Point-to-point transfer in a metropolitan area OADM ring network using the STMUX in accordance with the embodiments of the invention:

as shown in FIG. 12, in the OADM ring network, the STMUX provided in accordance with an embodiment of the invention is set in nodes A and C respectively. After a sub-rate service from node A to node C is multiplexed via STMUX, a point-to-point transfer of the sub-rate service is implemented by passing the intermediate nodes in a shared wavelength. The STMUX in use may be one BoardCard of the OADM equipment.

Figure 13:
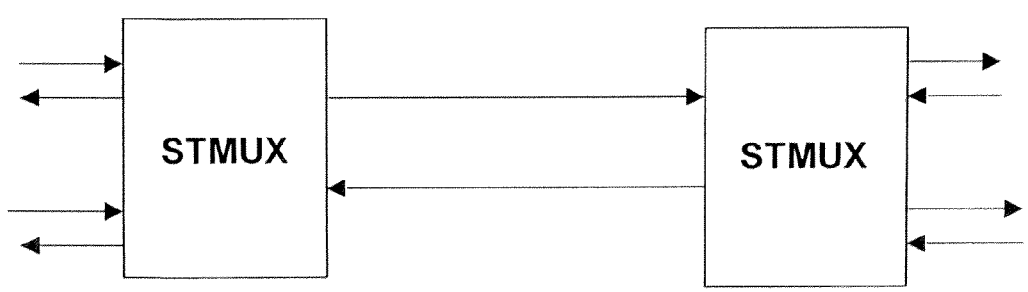
FIG. 13 is a schematic drawing illustrating the network topology structure for the sub-rate transparent multiplexer itself used as a subsystem to implement point-to-point transfer in accordance with an embodiment of the invention.

3) Point-to-point transfer with the STMUX itself as a subsystem:

as shown in FIG. 13, the STMUX may not only be used as a DWDM terminal device or a circuit unit of the OADM equipment, but also be used as an independent device to fulfill the point-to-point transparent transmission of a sub-rate service. Such application is suitable for a low cost occasion.

In accordance with the embodiments of the invention, the low speed signal may be an STM-1 signal, OC3 signal, STM-4 signal, OC12 signal and the like.

The foregoing is a preferred embodiment of invention and is not for use in limiting the invention, any modification, equivalent replacement or improvement made under the spirit and principles of the invention is included in the protection scope of the invention.

What is claimed is:

1. A method for transmitting low speed signals in an Optical Transport Network (OTN), said method being implemented by a multiplexing device, said method comprising:
   mapping each channel of low speed signal into an Optical Channel Data Unit (ODU) signal at the same grade as that of the low speed signal;
   byte interleaving each channel of Optical Channel Payload Unit (OPU) payload of ODU signal in each time slot of Optical Channel Payload Unit k (OPUk) payload area of Optical Channel Data Unit k (ODUk) signal;
   frame interleaving the OPU justification overhead corresponding to each channel of OPU payload of ODU signal in OPUk justification overhead of different frames of ODUk signal;
   frame interleaving the ODU overhead corresponding to each channel of OPU payload of ODU signal in ODUk overhead of different frames of ODUk signal;
   transforming said ODUk signal into an Optical Channel Transport Unit k (OTUk) signal and transmitting said OTUk signal in an OTN;
   wherein the index k represents a supported bit rate and the different versions of OPUk, ODUk and OTUk.

2. The method of claim 1, wherein:
said process of byte interleaving each channel of OPU payload comprises:
dividing said OPUk payload area of ODUk signal into one or more time slots, byte interleaving each channel of OPU payload of ODU signal in each time slot of OPUk payload area of ODUk signal, and identifying the type of OPU payload of ODU signal, the size and location of the time slot occupied by each channel of the OPU payload of ODU signal by using a payload structure identifier (PSI) corresponding to a multiframe indication;
said process of frame interleaving the OPU justification overhead comprises:
frame interleaving, according to the multiframe indication, the OPU justification overhead corresponding to each channel of OPU payload of ODU signal in OPUk justification overhead of different frames of ODUk signal;
said process of frame interleaving the ODU overhead comprises:
frame interleaving, according to the multiframe indication, the ODU overhead corresponding to each channel of OPU payload of ODU signal in ODUk overhead of different frames of ODUk signal.

3. The method of claim 2, wherein the low speed signal comprises N channels of low speed signals having the same rate which is 1/N times that of the OPUk payload area, N is a nature number; and
said process of byte interleaving each channel of OPU payload of ODU signal comprises:
dividing each OPUk payload area into N time slots, and byte interleaving N channels of OPU payload in the N time slots of each channel of OPUk payload of ODUk signal, respectively.

4. The method of claim 3, wherein the value of the N is 16 if the low speed signal is a Constant Bit Rate 155 (CBR155)

signal; the value of the N is 4 if the low speed signal is a Constant Bit Rate 622 (CBR622) signal.

5. The method of claim 2, wherein the low speed signal comprises at least two signals of different rates;
the size of each time slot is the greatest common divisor of the rates of the signals of different rates.

6. The method of claim 5, wherein the low speed signals are N channels of CBR155s and M channels of CBR622s, said ODU signal comprises an ODU155 signal and an ODU622 signal; said ODU155 signal contains OPU155 payload, OPU155 justification overhead and ODU155 overhead; said ODU622 signal contains OPU622 payload, OPU622 justification overhead and ODU622 overhead; said OPUk is an OPU1, said ODUk signal is an ODU1 signal, and N+4XM=16; and
said process of byte interleaving each channel of OPU payload comprises:
dividing each OPU1 payload area into 16 time slots evenly, byte interleaving N channels of OPU155 payload and M channels OPU622 payload in each time slot respectively, and identifying, by using the PSI corresponding to the multiframe indication, the type of the OPU payload, the size and location of time slot occupied by each channel of OPU payload, wherein one channel of OPU622 payload occupies 4 time slots, one channel of OPU155 payload occupies one time slot; and
said process of frame interleaving the OPU justification overhead comprises:
frame interleaving N channels of OPU155 justification overhead and M channels of OPU622 justification overhead in the OPU1 justification overhead according to the multiframe indication; and
said process of frame interleaving the ODU overheads comprises:
frame interleaving N channels of ODU155 overhead and M channels of ODU622 overhead in the ODU1 overhead according to the multiframe indication;
said process of transforming the ODUk signal comprises:
transforming said ODU1 signal into an OTU1 signal and transmitting said OTU1 signal in an OTN.

7. The method of claim 2, wherein said multiframe indication is the multiframe signal generated locally and is transferred by utilizing a multiframe alignment signal (MFAS) byte in an OTU frame or other reserved bytes.

8. The method of claim 2, wherein said process of transforming the ODUk comprises:
adding OTUk overhead to said ODUk, wherein k=1 represents an approximate bit rate of 2.5 Gbit/s, k=2 represents an approximate bit rate of 10 Gbit/s, and k=3 represents an approximate bit rate of 40 Gbit/s.

9. The method of claim 2, wherein the PSI corresponding to the multiframe indication comprises a payload type indication and reserved bytes distributed in different frames; the original codes or reserved codes of the payload type indication are used for indicating the type of OPU payload, and said reserved byte in the PSI corresponding to the multiframe indication are used for indicating the size and location of the time slot occupied by each channel of OPU payload.

10. The method of claim 9, wherein said payload type indication is the PSI byte corresponding to the MFAS equal to 00000000 or any byte of 1 to 255 PSI bytes corresponding to the MFAS equal to values other than 00000000.

11. The method of claim 9, wherein said reserved bytes distributed in different frames in the PSI are at least one byte of 1 to 255 PSI bytes corresponding to the MEAS equal to values other than 00000000.

12. The method of claim 2, wherein the PSI corresponding to the multiframe indication comprises the reserved bytes distributed in different frames; the reserved byte in the PSI is used for indicating the type of the each channel of OPU payload, the size and location of the time slot occupied by the each channel of OPU payload.

13. The method of claim 2, wherein said ODU overhead comprises at least a performance monitoring overhead field.

14. The method of claim 2, wherein said low speed signal is at least one of an STM-1, an OC3, an STM-4, and an OC12 signal.

15. A method for transmitting low speed signals in an Optical Transport Network (OTN), said method being implemented by a de-multiplexing device, said method comprising:
obtaining a multiframe indication upon the completion of Optical Channel Transport Unit (OTU) frame synchronization;
separating Optical Channel Data Unit (ODU) overhead of each channel from an Optical Channel Data Unit k (ODUk) signal according to the multiframe indication;
separating Optical Channel Payload Unit (OPU) justification overhead of each channel from Optical Channel Payload Unit k (OPUk) justification overhead according to the multiframe indication;
separating OPU payload of each channel from the time slots of OPUk payload areas according to the multiframe indication and the payload structure identifier (PSI) corresponding to the multiframe indication; and
making a combination of the ODU overhead, OPU justification overhead and OPU payload of each channel to recover an ODU signal, and recover an original low speed signal from the ODU signal.

16. The method of claim 15, wherein said multiframe indication is a multiframe alignment signal (MFAS) byte in an OUT frame or other reserved bytes.

17. The method of claim 15, wherein the PSI corresponding to the multiframe indication comprises a payload type indication and reserved bytes distributed in different frames; the original codes or reserved codes of the payload type indication are used for indicating the payload type, and the reserved bytes in the PSI corresponding to the multiframe indication are used for indicating the type of OPU payload, the size and location of the time slot occupied by each channel of OPU payload.

18. The method of claim 15, wherein the PSI corresponding to the multi frame indication comprises the reserved bytes distributed in different frames; the reserved bytes in the PSI are used for indicating the type of OPU payload, the location and size of the time slot occupied by each channel of OPU payload.

19. The method of claim 15, wherein said low speed signal is at least one of an STM-1, an OC3 signal, an STM-4 signal and an OC12 signal.

20. A device for transmitting low speed signals in an Optical Transport Network (OTN), comprising:
more than one synchronization physical interface, for transforming each channel of signal into a Constant Bit Rate (CBR) parallel clock signal and CBR parallel data;
more than one mapping module, for receiving said CBR parallel clock signal and said CBR parallel data sent from said corresponding synchronization physical interface, mapping said parallel clock signal and data into an Optical Channel Payload Unit (OPU) frame, encapsulating the OPU with Optical Channel Data Unit (ODU) overhead, and outputting an ODU parallel clock signal and ODU parallel data;

a multiplexing module, for receiving said ODU parallel clock signal and ODU parallel data sent from said more than one mapping module, interleaving each channel of OPU payload in corresponding time slots of Optical Channel Payload Unit k (OPUk), frame interleaving each channel of OPU justification overhead in the justification overhead of OPUk of different frames according to a multiframe indication, and fulfilling the interleaved multiplexing of all ODU overhead according to the multiframe indication to obtain an ODUk signal and clock signal;

a line module, for receiving said ODUk signal and clock signal sent from the multiplexing module, transforming the ODUk signal into an Optical Channel Transport Unit k (OTUk) signal and outputting the OTUk signal;

a timing generator, for providing a local timing signal for said mapping modules, multiplexing module and line module.

21. A device for transmitting low speed signals in an Optical Transport Network (OTN), comprising:

a line module, for receiving an Optical Channel Transport Unit k (OTUk) signal and transforming said OTUk signal into an Optical Channel Data Unit k (ODUk) signal;

a de-multiplexing module, for receiving said ODUk signal sent from said line module, separating the ODU overhead of each channel from said ODUk signal, separating the Optical Channel Payload Unit (OPU) justification overhead of each channel from the Optical Channel Payload Unit k (OPUk) justification overhead and separating the OPU payload information of each channel from the time slots of OPUks so as to obtain an ODU signal of each channel;

more than one de-mapping module, for respectively receiving ODU signals of all channels which are sent from the dc-multiplexing module, recovering a Constant Bit Rate (CBR) parallel clock signal and CBR parallel data;

more than one synchronization physical interface, for respectively receiving said CBR parallel clock signal and CBR parallel data sent from all de-mapping modules and recovering a ultimate client signal CBR;

a timing generator, for providing a local timing signal said de-mapping module, de-multiplexing module and line module.

22. A device for transmitting low speed signals in an Optical Transport Network (OTN), comprising;

more than one synchronization physical interface, for transforming each channel of Constant Bit Rate (CBR) signal into a CBR clock signal and CBR parallel data; for receiving a CBR parallel clock signal and CBR parallel data and recovering a CBR signal;

more than one mapping/de-mapping module, for receiving the CBR clock signal and CBR parallel data sent from the corresponding synchronization physical interface, mapping the CBR parallel clock signal and CBR parallel data into an Optical Channel Payload Unit (OPU) frame, encapsulating the OPU with Optical Channel Data Unit (ODU) overhead, and outputting an ODU parallel clock signal and ODU parallel data; and for respectively receiving ODU signals of all channels, recovering a CBR parallel clock signal and CBR parallel data from an OPU payload area and obtaining, and sending the recovered CBR parallel clock signal and CBR parallel data to the synchronization physical interfaces;

multiplexing/dc-multiplexing module, for receiving said ODU parallel clock signal and ODU parallel data sent from the mapping/de-mapping module, interleaving each channel of OPU payload in corresponding time slots of Optical Channel Payload Unit k (OPUk), frame interleaving each channel of OPU justification overhead in the justification overhead of OPUk of different frames according to a multiframe indication, and fulfilling the interleaved multiplexing of all ODU overhead according to the multiframe indication to obtain an Optical Channel Data Unit k (ODUk) signal and clock signal; and for receiving an ODUk signal, separating the ODU overhead of each channel from the received ODUk signal, separating the OPU justification overhead of each channel from the OPUk justification overhead and separating the OPU payload information of each channel from the time slots of OPUks so as to obtain an ODU signal of each channel, and sending the obtained ODU signal to the mapping/de-mapping module;

a line module, for receiving said ODUk signal and clock signal sent from said multiplexing/de-multiplexing module, transforming said ODUk signal into an OTUk signal and outputting the OTUk signal; for receiving an Optical Channel Transport Unit k (OTUk) signal, transforming the received OTUk signal into an ODUk signal, and sending the ODUk signal to said multiplexing/dc-multiplexing module;

a timing generator, for providing a signal for said mapping/de-mapping modules, multiplexing/de-multiplexing module and line module.

* * * * *

UNITED STATES PATENT AND TRADEMARK OFFICE
CERTIFICATE OF CORRECTION

PATENT NO. : 7,583,697 B2
APPLICATION NO. : 11/677727
DATED : September 1, 2009
INVENTOR(S) : Shimin Zou It is certified that error appears in the above-identified patent and that said Letters Patent is hereby corrected as shown below:

In claim 11, column 17, line 66, "MEAS" should read --MFAS--.

In claim 18, column 18, line 47, "multi frame" should read --multiframe--.

In claim 21, column 19, line 35, "dc-multiplexing" should read --de-multiplexing--.

In claim 21, column 19, line 40, "a ultimate" should read --an ultimate--.

In claim 21, column 19, line 41, "signal said" should read --signal for said--.

In claim 22, column 19, line 45, "comprising;" should read --comprising:--.

In claim 22, column 20, line 17, "multiplexing/dc-multiplexing" should read --multiplexing/de-multiplexing--.

In claim 22, column 20, lines 42-43, "multiplexing/dc-multiplexing" should read --multiplexing/de-multiplexing--.

Signed and Sealed this

Seventeenth Day of November, 2009

David J. Kappos
*Director of the United States Patent and Trademark Office*